Aug. 30, 1966  M. D. McMILLAN, JR  3,270,226
CLAMP FOR AXIAL ADJUSTMENT OF A SMALL MOTOR SHAFT
Filed March 20, 1964
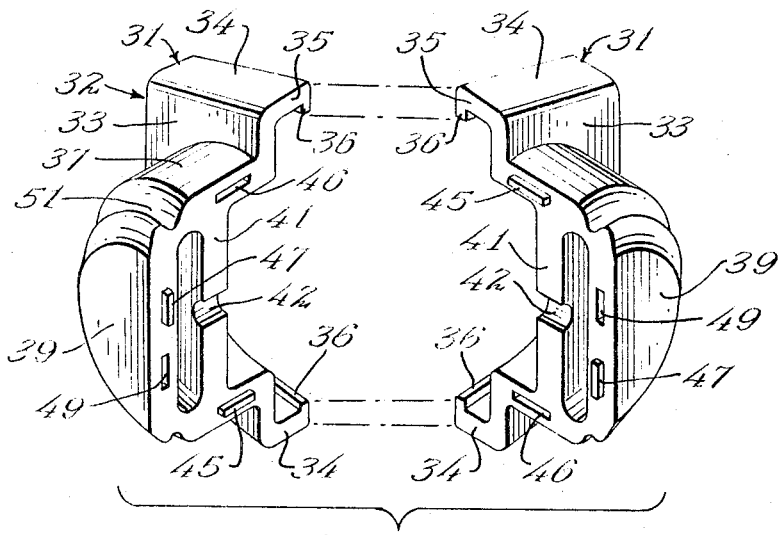
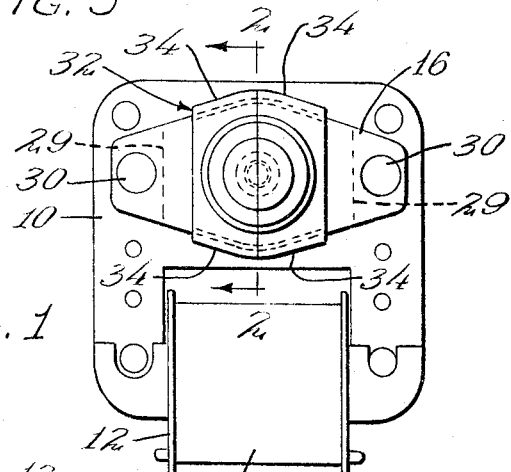
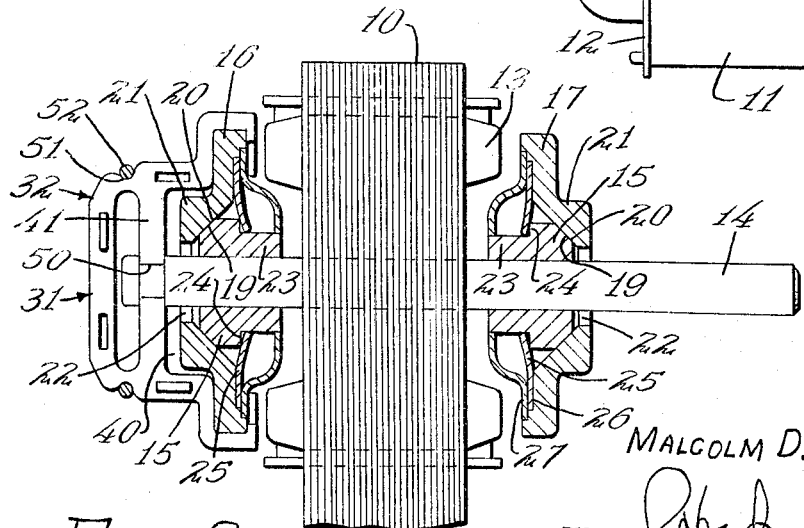
INVENTOR
MALCOLM D. McMILLAN, JR.
BY
ATTORNEY United States Patent Office 3,270,226
Patented August 30, 1966

3,270,226
CLAMP FOR AXIAL ADJUSTMENT OF A SMALL MOTOR SHAFT
Malcolm D. McMillan, Jr., St. Paul, Minn., assignor to McMillan Manufacturing Company, St. Paul, Minn., a corporation of Minnesota
Filed Mar. 20, 1964, Ser. No. 353,446
8 Claims. (Cl. 310—90)

This invention relates to an improvement in small electric motors and deals particularly with a means for controlling the rotor thrust and free play of the rotor shaft.

Fractional horse power electric motors have been traditionally manufactured in such a way that the lateral free play of the rotor and shaft has been controlled by end play washers which are located between the motor shaft bearings and the rotor itself. Washers of this type are a source of noise, which is particularly undesirable in conjunction with motors used for operating small blowers used in conjunction with television receiving sets and high fidelity sound equipment and the like. Furthermore, these washers act as thrust washers which ride against the ends of the bearings. Not only do such washers normally require lubrication, but also they have a tendency to throw the oil outwardly due to centrifugal force thus greatly reducing the lubrication which should be used in the bearings. Thus the use of such washers is usually tolerated merely because they seem to be a necessary evil.

Another problem which exists in holding the rotor shafts from rotation lies in the fact that the rotor as well as the body of the motor is laminated and great difficulty is experienced in maintaining completely uniform sizes. As a result, the distance between the rotor and the bearing has a tendency to vary. Thus the thickness of the thrust washers must also vary if the end play of the rotor shaft is held between desirable limits. A certain amount of end play is desirable to prevent undue friction.

It is an object of the present invention to provide an end cap designed for attachment to a motor bracket on one side of the motor and preferably produced of a solid lubricant plastic such as nylon or nylatron. This end cap includes an apertured wall designed to engage in a notch or peripheral groove in the motor shaft by engagement of the plastic wall into the groove, the rotor shaft may be held from end movement within narrow limits, allowing only the amount of end play which is necessary and desirable.

A further feature of the present invention resides in the provision of an end cap which is separately split, and which may be attached to the motor bracket by sliding the two halves on to the bracket from opposite ends. The end cap is provided with a cylindrical wall provided with an end closure to close one end of the motor shaft. The cylindrical wall is preferably provided with what amounts to a partition wall which is apertured to engage in the groove of the shaft. The two parts of the end cap are held together by a suitable retaining ring, the ring not only holding the two parts to the cap assembled, but also holding the cap in place upon the motor bracket. Accordingly, the assembly of the structure is extremely simple.

These and other objects and novel features of the present invention will be more clearly and fully set forth in the following specification and claims.

In the drawings forming a part of the specification;

FIGURE 1 is a side elevational view of a small electric motor showing the end cap in place thereupon.

FIGURE 2 is a vertical sectional view through a portion of the motor shown in FIGURE 1 but on an enlarged scale, the position of the section being indicated by the line 2—2 of FIGURE 1.

FIGURE 3 is a perspective view of the two parts of the end cap which have been separated to illustrate the construction thereof.

The drawings illustrate a single coil two-pole electric motor skeleton which is generally of conventional type. The body 10 of the motor is made up of a series of laminations of sheet metal forming a stack of predetermined thickness which may vary within wide limits. The coil 11 is supported by a bobbin 12 positioned between the sides of the laminated body by any suitable means.

The rotor 13 is of conventional form for motors of this type and is secured to the rotor shaft 14. The shaft 14 is rotatably supported by a pair of bearings 15 supported by motor brackets 16 and 17 on opposite sides of the motor body 10. In the particular arrangement illustrated, the bearings 15 are provided with frusto-conical outer end portions 19 which seat against similarly tapered shoulders 20 in apertured bosses 21 projecting outwardly from the motor brackets 17 intermediate the ends thereof. The shaft 14 extends freely through axial apertures 22 in the bosses 21.

The inner opposed ends of the bearings 15 are of reduced diameter as indicated at 23 providing external peripheral shoulders 24 between the ends of the bearings. Bearing springs 25 are mounted in cylindrical recesses 26 in the inner surfaces of the motor brackets 16 and 17 in concentric relation with the bearings 15. Bearing retainers 27 are similarly supported by the motor brackets 17 to retain the bearings and bearing springs in place. In view of the fact that the structure thus described is conventional, a more detailed description is believed unnecessary.

As indicated in FIGURE 1 of the drawings, the motor brackets 15 are laterally elongated, and the ends of the motor brackets are provided with inwardly directed legs 29 which engage against opposite sides of the motor body 10. The motor brackets 16 and 17 on opposite sides of the motor body are held in assembled relation by bolts or similar means 30 which extend through the ends of the brackets and through the body 10.

The structure which forms the basis of the present invention is illustrated in perspective in FIGURE 3 of the drawings. The two parts 31 make up the end cap which is indicated in general by the numeral 32 and the parts 31 are given the same identifying numeral as they are preferably identical. Each of the end cap sections 31 includes an outer plate portion 33 having along its upper and lower edges inwardly extending flange 34. The term "inwardly" as used in the description is meant to indicate that the flanges 34 extend toward the body of the motor. As is indicated in FIGURE 1 of the drawings, the flanges 34 of each section 31 converge toward one another as they extend laterally from the central abutting face 35 of each section. Stated otherwise, the motor brackets are vertically wider at the center than at the ends which are bolted together, and the flanges 34 are generally designed to conform to the shape of the upper and lower edges of the motor brackets.

The inner edges of the tapering flanges 34 are provided with coplanar opposed retaining flanges 36 which, as shown in FIGURE 2 of the drawings, engage inwardly of the motor brackets 16. Thus, in effect, the two sections 31 forming the end cap 32 are provided with grooved or channel-shaped edges which hold the end cap 32 from movement in the direction axially of the motor shaft.

A semi-cylindrical sleeve 37 extends outwardly from the flat portion 33 of the cap sections, and the sleeves 37 are closed at their outer ends by end closure plates 39. The flat plate portions 33 are apertured in alignment with the inner circumference of each semi-cylindrical portion 37 so that the inner end of each sleeve forms a compartment 40 for accommodating the outwardly projecting boss 21 of the motor bracket 16. A partition wall 41 extends across each semi-circular sleeve 37 intermediate the ends thereof. A semi-cylindrical notch 42 is provided at the center of each partition wall 41, the two notches 42 forming a cylindrical aperture when the two sections 31 of the cap are in edge abutting relation.

As will be clearly noted from FIGURE 3 of the drawings, the abutting faces of the two sections 31 terminate almost entirely on a common vertical plane including the air opposed edges of the flanges 35 and 36, the plate portion 33, the sleeve 37, the end closure 39 and the partition wall 41. Thus when assembled, the two sections 31 form in effect a single cap.

Means are provided to hold the two sections 31 in a fixed relation. Each of the sections 31 includes a rectangular tongue 45 projecting beyond the abutting surface 35 of the sleeve 37 and a similarly shaped socket 46 on the surface of the sleeve which is diametrically opposed. While the two sections 31 are identical, the section illustrated at the right in FIGURE 3 must be inverted relative to the section shown at the left in the same figure in order that the flat surfaces 35 abut. Accordingly the tongue 45 of the right hand section will fit into the socket 46 of the left hand section, and the tongue 45 of the left hand section will fit into the socket 46 in the right hand section when the two sections are abutted. In a similar manner, the abutting surface 35 of the end closure 39 of each section is provided with a tongue 47 projecting therefrom on one side of the axial center of the enclosure and a socket 49 on the other side of center, the tongue and socket being equally spaced from the axial center of the enclosure. As a result, when one section is inverted relative to the other as indicated in FIGURE 3, the tongue 47 of the left hand section will fit into the socket 49 of the right hand section, and the tongue 47 of the right hand section will fit into the socket 49 of the left hand section.

As is indicated in FIGURE 2 of the drawings, the motor shaft 14 is provided with a peripheral groove 50 in the end of the shaft extending through the motor bracket 16, the groove 50 being substantially equal in width to the thickness of the partition wall 41. The semi-cylindrical notches 42 of the two sections 31 are of substantially equal radius to the reduced diameter portion of the shaft at the base of the groove 50, the fit being sufficiently close to permit free rotation of the shaft but providing very little play. As the end cap 32 is preferably formed of a lubricating plastic material such as nylon or nylatron, extremely little wear is experienced in the end caps even where the motors are operated continuously for long periods of time. As a result, the rotor shaft 14 is effectively held from axial movement within the bearings 15 when the end cap 32 is in place.

In order to hold the two sections 31 assembled as shown in FIGURE 1 of the drawings, the outer end portion of the sleeve 37 is peripherally grooved as indicated at 51, each of the sections including a semi-circular groove which forms a continuous circular groove when the two sections are abutted. A retaining ring 52 is placed in the groove 51 to hold the sections assembled. The retaining ring may be a split ring of resilient material, or may be a continuous ring of elastic material. Alternatively, the ring may be relatively inflexible, and the plastic forming the cap 32 may be compressed sufficiently to apply the ring 52 in the groove.

In accordance with the patent statutes, the principles of construction and operation of this improvement in electric motors have been described, and while an endeavor has been made to set forth the best embodiment thereof, it should be understood that changes may be made within the scope of the following claims without departing from the spirit of the invention.

I claim:
1. In combination with an electrical motor including a motor body, a rotor rotatable within said body, a rotor shaft supporting said rotor, motor brackets on opposite sides of said motor body and including bearings supporting said shaft, a means of holding said shaft from axial movement including,
   a cap secured to one said motor bracket,
   a wall in said cap encircling one end of said shaft, and
   a groove in said shaft into which said wall extends to hold said shaft from endwise movement,
   said wall being of substantially equal width to said groove and secured from movement axially of said shaft.

2. The structure of claim 1 and in which said cap is made of a lubricant plastic.

3. In combination with an electrical motor including a motor body, a rotor rotatable within said body, a rotor shaft supporting said rotor, motor brackets on opposite sides of said motor body and including bearings supporting said shaft, a means of holding said shaft from axial movement including,
   a cap secured to one said motor bracket,
   said cap being split on a plane through the axis of said shaft,
   said shaft having a peripheral groove therein,
   said cap including a wall extending substantially normal to the axis of said shaft and of a thickness substantially equal to the width of said groove,
   the halves of said split cap including substantially semi-circular notches to accommodate the portion of said shaft at the base of said groove.

4. The structure of claim 3 and in which said cap is made of a lubricant plastic material.

5. In combination with an electrical motor including a motor body, a rotor rotatable within said body, a rotor shaft supporting said rotor, elongated motor brackets secured on opposite sides of said body and including bearings through which said shaft extends, said motor brackets tapering in width from the center through which the shaft extends toward opposite ends thereof, an apparatus for holding the motor shaft from axial movement including,
   an end cap formed of two parts separated on a plane through the shaft axis and at right angles to the longitudinal axis of one of said motor brackets,
   said end cap having an end plate engageable in face contact with the outer surface of said one motor bracket,
   opposed generally channel shaped flanges on the edges of said end plate shaped to engage the edges of said one motor bracket,
   a generally cylindrical sleeve extending outwardly from said end plate coaxial with said shaft,
   said shaft having a peripheral groove therein inwardly of said sleeve,
   a wall within said sleeve engageable into said notch and substantially equal in thickness to the width of said notch, and
   means securing said two parts of said cap together encircling said shaft.

6. The structure of claim 5 and including an end closure on said sleeve overlying the grooved end of said shaft.

7. The structure of claim 5 and in which said cap is formed of a lubricant plastic material.

8. The structure of claim 5 and in which the two parts of said cap are identical and including,
   projections on and sockets in the abutting edges of said two parts to hold said two parts in proper relation.

No references cited.

MILTON O. HIRSHFIELD, *Primary Examiner.*

J. W. GIBBS, *Assistant Examiner.*